Oct. 11, 1938.   S. R. LARGE   2,133,030
ANTIFRICTION BEARING AND METHOD OF MAKING SAME
Filed Dec. 12, 1935

INVENTOR:
SAMUEL R. LARGE,
BY Gales P. Moore
HIS ATTORNEY

Patented Oct. 11, 1938

2,133,030

UNITED STATES PATENT OFFICE 2,133,030

ANTIFRICTION BEARING AND METHOD OF MAKING SAME

Samuel R. Large, Bristol, Conn., assignor to General Motors Corporation, Detroit, Mich., a corporation of Delaware Application December 12, 1935, Serial No. 54,108

8 Claims. (Cl. 29—148.4)

This invention relates to antifriction bearings and comprises all of the features of novelty herein disclosed. An object of the invention is to provide an improved means and method to facilitate the securing together of the sections of a separator or retainer. Another object is to provide means to facilitate the manufacture and assembly of an antifriction bearing, especially of the type wherein two rows of rolling elements are widely spaced apart and have a two-piece retainer which is assembled and fastened while lying between the race rings.

To these ends and also to improve generally upon devices of this character, the invention consists in the various matters hereinafter described, and claimed. In its broader aspects, the invention is not necessarily limited to the specific constructions selected for illustrative purposes in the accompanying drawing in which Fig. 1 is an axial section of an antifriction bearing embodying the invention.

Figure 1:
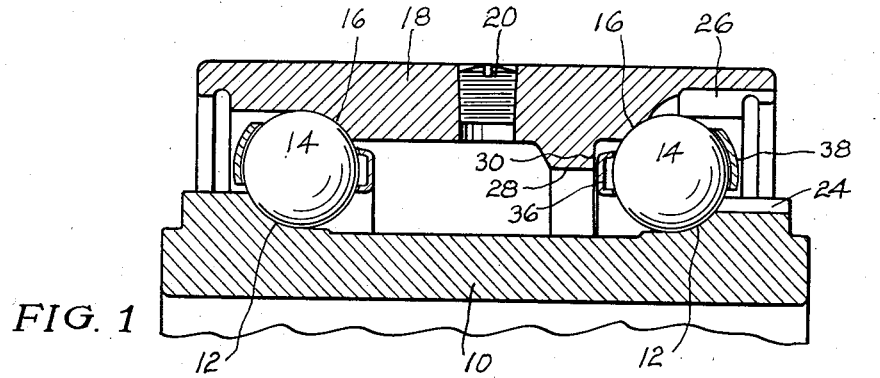

The numeral 10 indicates an inner race ring having widely spaced raceways 12 for two rows of rolling elements herein shown as balls 14 which also engage raceways 16 in an outer race ring 18. To introduce lubricant or clean out the bearing, the outer race ring has a filling opening closed by a screw plug 20. At one end of the bearing, there are loading grooves 24 and 26 through which the balls of the adjacent row are inserted. One of the race rings, preferably the outer one, is provided with an annular projection or rib 28 forming an annular abutment or staking shoulder 30 directed towards that end of the bearing having the loading grooves and spaced from the adjacent balls a distance depending on the construction of the separator or retainer.

The retainer or separator comprises two sections 36 and 38, the section 38 being of wavy form to provide pockets or recesses for the balls, the pockets being connected by substantially flat webs 40 lying between the balls and having openings 42. The other section 36 comprises a ring of channelled cross section disposed at one side of the balls and having fingers or struts 44 and 46 extending between the balls. The inner fingers or struts 44 abut against the webs 40. The outer fingers or struts 46 have wings 48 abutting against the webs 40 with extensions or tabs 50 passing through the openings 42 to be bent inwardly and staked or clenched against the outside of the webs.

The general type of antifriction bearing and ball retainer herein shown is well known, being disclosed in detail in patent to Hughes, 1,794,772, granted Mar. 3, 1931. In the patent and in the present bearing, one row of balls (the left row) is assembled on the inner race ring before the outer race ring is applied. The retainer and balls for this row are then accessible for assembly and fastening operations after which the outer race ring can be shifted axially to the left into assembled position. The other row of balls is then assembled between the race rings by individually inserting the balls through the loading grooves. When a two-piece retainer or separator is used for the second row of balls, the section 36 is inserted between the race rings before the balls, and that section is indexed around or rotated to receive the balls between the struts following which the outer section 38 of the retainer is applied and fastened to the first by bending down the tabs 50. In the case of a narrow bearing or one having the ball rows close together as in the above patent, the first retainer, if made stiff enough, can be conveniently used as an anvil to back up the second when the securing tabs are clenched. When however the rows of balls are far apart as illustrated in the present drawing, the channelled sections 36 of the two retainers would have to be unduly deep or long to abut against one another. Hence the annular shoulder 28 is provided to act as an anvil or backing for the adjacent channelled section 36 when the tabs 50 are staked or clenched.

Figures 2, 3:
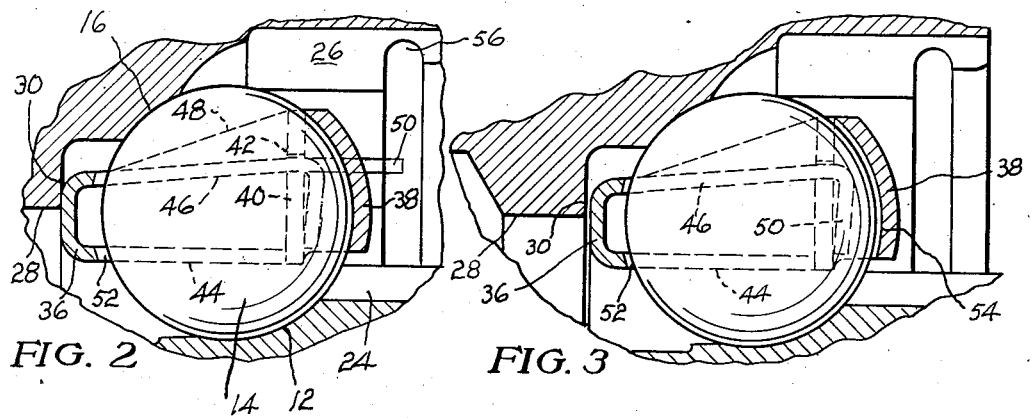
Fig. 2 is a similar section of a portion of the bearing illustrating the method of assembling and fastening the retainer or separator.
Fig. 3 is a section similar to Fig. 2 with the parts in the running position.

As indicated in Fig. 2, the clenching pressure will displace the channelled section 36 until it abuts against the shoulder, this action initially bringing about a clearance with the balls at the point 52 and bringing the pocketed section 38 solidly against the balls. When the clenching operation is completed and the clenching pressure released, the elasticity of the retainer sections will bring about a movement of the channelled section 36 away from the shoulder 28, reducing the clearance at 52 and also providing the normal small clearance at 54. This running clearance is exaggerated in the drawing for purposes of illustration. The grooves 56 in the race rings are provided to receive suitable seals. While the present invention is shown as embodied in a double row bearing with two-piece retainers, the staking or clenching shoulder is readily adaptable to some types of one-piece separators which have fingers or other displaceable portions bent to embrace the balls or other rolling elements after the latter are inserted in the bearing, thereby making unnecessary the use of special bending or anvil-forming tools.

Figure 4:
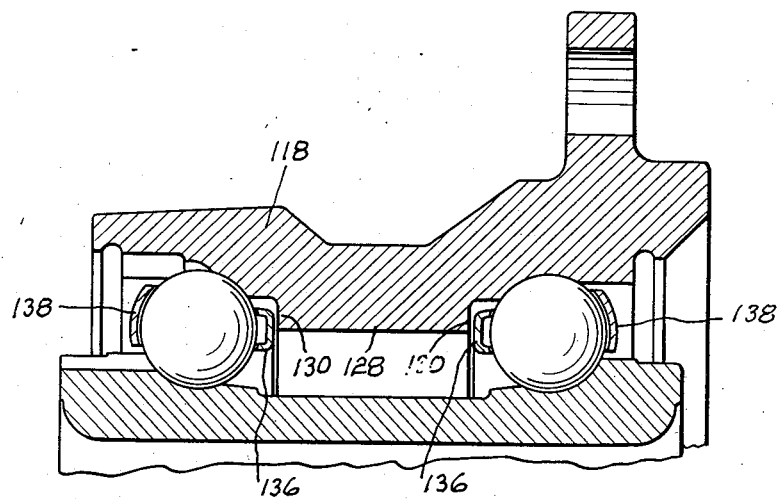
Fig. 4 is a view similar to Fig. 1 of a modification.

As shown in Fig. 4, one of the race rings 118 may be provided with a wide internal rib 128 providing staking shoulders 130 at each side for backing up the adjacent retainer sections 136 when the corresponding outer sections 138 are secured to them.

I claim:

1. In a double row antifriction bearing, a pair of race rings with loading grooves at one end, two spaced rows of rolling elements between the rings, a two-piece separator for the row of rolling elements adjacent to the loading grooves, fastening means for the separator sections in combination with a rigid abutment projecting from one of the race rings alongside of and into close proximity to the separator to act as an anvil for the separator fastening means; substantially as described.

2. In an antifriction bearing having a pair of race rings and two rows of rolling elements between the race rings, an annular rib projecting from one of the race rings in proximity to one of the rows of rolling elements, and a sectional separator for said row of rolling elements and having one section in close proximity to and adapted to abut against the rib when the other section is being fastened thereto; substantially as described.

3. In an antifriction bearing having a pair of race rings and two rows of rolling elements between the race rings, an annular rib projecting from one of the race rings and having abutment faces at each side in spaced relation to the rows of rolling elements, and a two-piece separator for each row of rolling elements, each separator having an inner section in close proximity to and adapted to abut against the adjacent abutment face when the outer section is being fastened thereto; substantially as described.

4. In an antifriction bearing, a race ring having a raceway, rolling elements engaging the raceway, a two-piece separator for the rolling elements, fastening means for the sections of the separator, and an annular rib projecting from the race ring and having an abutment face alongside of and in close proximity to the inner section of the separator to form a staking shoulder for the fastening means; substantially as described.

5. The method of securing a separator to rolling elements in the restricted annular space between opposed one-piece race rings of a bearing, which consists in utilizing a rigid shoulder on one of the race rings as an abutment to back up the separator, and applying pressure to portions of the separator in opposition to the abutment to secure the separator and rolling elements together; substantially as described.

6. The method of assembling separator sections between opposed bearing race rings and about a series of rolling elements, which consists in inserting a first separator section and rolling elements laterally between the rings, inserting a second separator section laterally between the rings, and utilizing a rigid abutment on one of the race rings to back up the separator sections while applying pressure to separator fastening means in opposition to the abutment; substantially as described.

7. In an antifriction bearing, a pair of one-piece race rings, rolling elements between the race rings, a separator for the rolling elements with securing means for holding the separator and its rolling elements assembled, in combination with a rigid abutment carried by one of the race rings and projecting alongside of the separator in close proximity thereto to serve as an anvil for the securing of the separator in assembled relation to the rolling elements; substantially as described.

8. In an antifriction bearing, a pair of race rings, rolling elements between the race rings, a separator for the rolling elements with securing means for holding the separator and its rolling elements assembled, in combination with a rigid abutment on one of the race rings and projecting alongside of the separator in close proximity thereto, the clearance between the separator and the abutment being sufficiently small and the separator having sufficient elasticity to engage the abutment when lateral pressure is applied to the separator to secure it about the rolling elements; substantially as described.

SAMUEL R. LARGE.